United States Patent [19]
Nieder

[11] 3,907,083
[45] Sept. 23, 1975

[54] CONTROLLABLE BI-DIRECTIONAL COUPLING DEVICE

[76] Inventor: Berthold L. Nieder, Page Rd. R.F.D. 3, Bow, N.H. 03103

[22] Filed: July 22, 1974

[21] Appl. No.: 490,734

[52] U.S. Cl. ............... 192/41 A; 192/43; 192/45.1; 192/47; 192/84 T
[51] Int. Cl.² ...F16D 13/04; F16D 41/10; F16D 43/00; F16D 37/02
[58] Field of Search ........... 192/41 A, 44, 43, 45.1, 192/47, 84 T

[56] References Cited
UNITED STATES PATENTS

| | | | |
|---|---|---|---|
| 2,843,237 | 7/1958 | Carr | 192/84 T X |
| 2,910,159 | 10/1959 | Nielsen | 192/84 T |
| 3,164,234 | 1/1965 | Tamarin | 192/47 X |
| 3,179,218 | 4/1965 | Burns | 192/84 T X |
| 3,437,185 | 4/1969 | Daugherty | 192/45.1 UX |

*Primary Examiner*—Samuel Scott
*Assistant Examiner*—Lance W. Chandler
*Attorney, Agent, or Firm*—Parrott, Bell, Seltzer Park & Gibson

[57] ABSTRACT

A device functioning as a clutch or brake in either of two directions of rotation is provided by an arrangement of first and second members having corresponding first and second coupling surfaces. One of the members is arranged for controllable variation in a dimension of the corresponding one of the coupling surfaces and a plurality of coupling members are arranged to frictionally engage both of the surfaces upon such controlled variation in dimension. Certain of the coupling members are in frictional engagement upon relative rotation between the first and second members in one direction, while the remainder are in frictional engagement upon relative rotation therebetween in the opposite direction.

11 Claims, 9 Drawing Figures

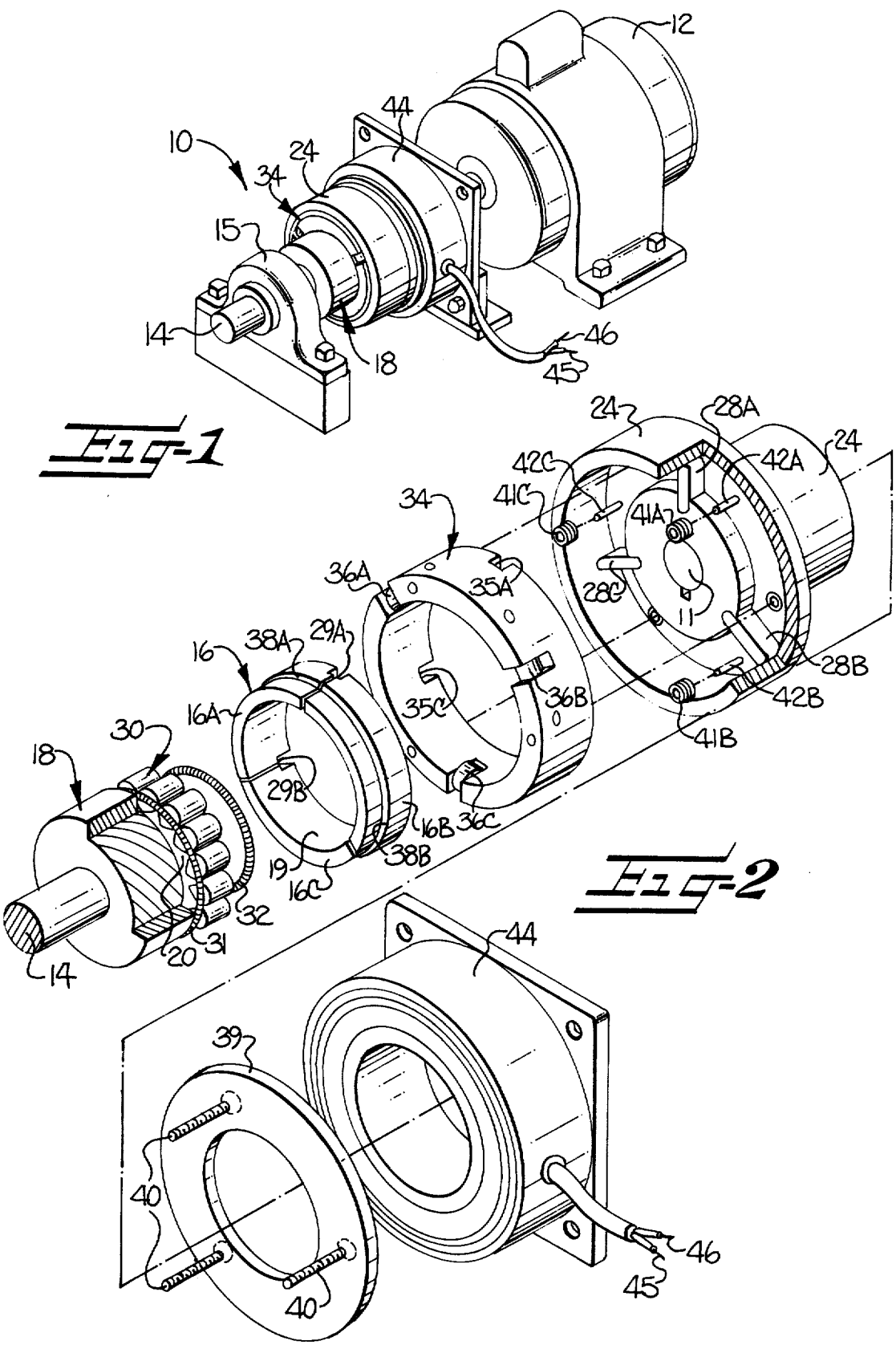

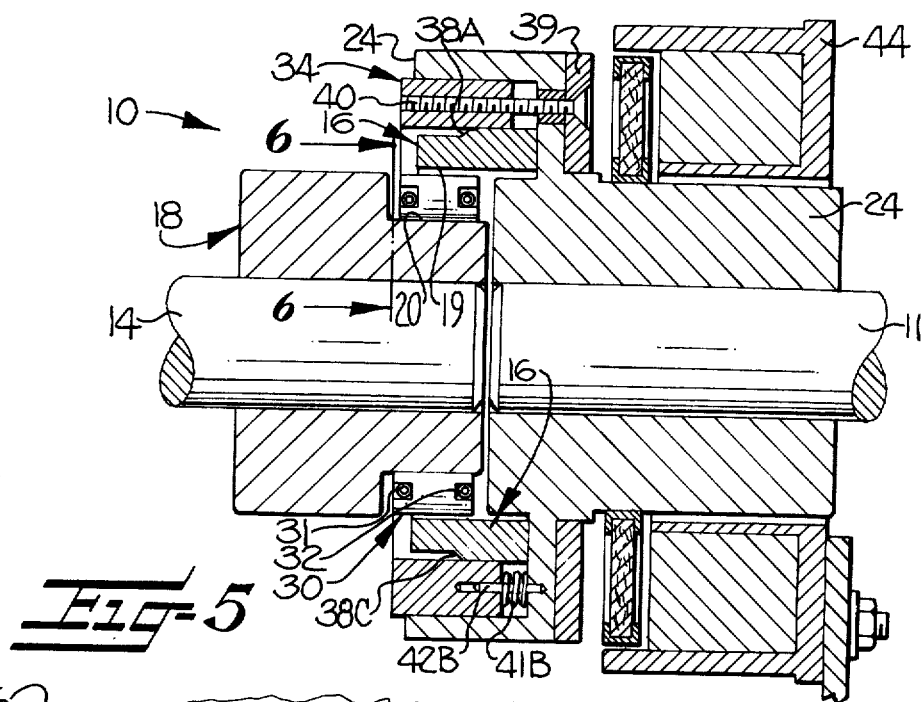
FIG-5
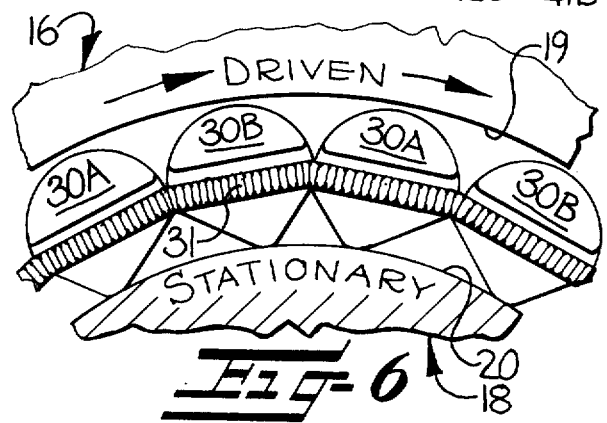
FIG-6
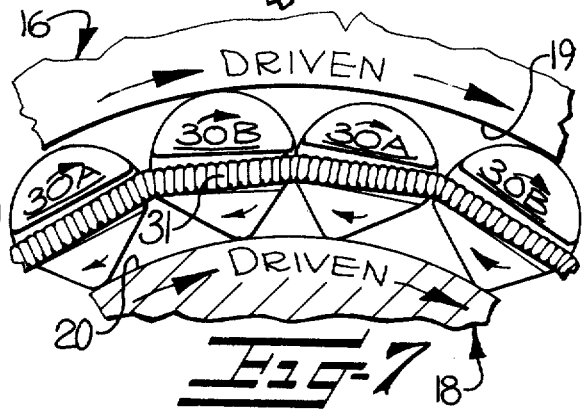
FIG-7
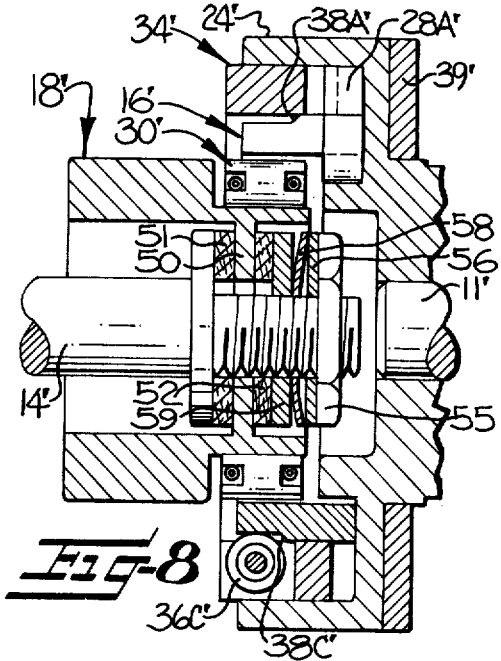
FIG-8
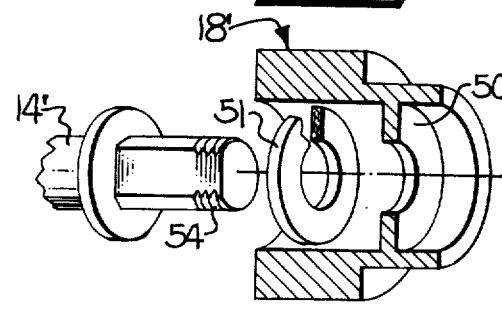
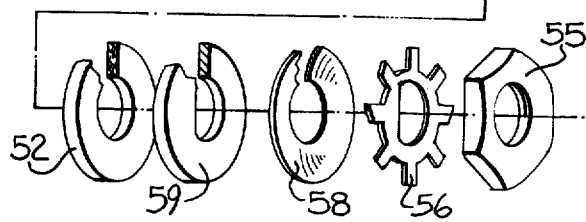
FIG-9

CONTROLLABLE BI-DIRECTIONAL COUPLING DEVICE

The recognized problems of controllably transmitting rotational driving force or controllably exerting a braking force on a rotating element have led to a long history of development of clutches and brakes. While such development has successfully solved a great many difficulties and has produced a range of types of such devices, it is been recognized that the ever more highly sophisticated solutions to these problems still have shortcomings in certain instances.

Particularly in circumstances where it is desired to use an electrical control over clutch or brake action, devices developed heretofore have required specialized electrical controls operating on direct current rather than on the alternating current which is more readily available in most industrial enviroments. Further, devices relying upon the use of direct current controls typically are responsive to the characteristics of direct current applied, in that slip in transmission or braking force applied varies with the control current characteristics. In many industrial applications, such somewhat unpredictable variance is entirely unacceptable.

With other types of devices, positive controlled engagement is achieved, but only under certain circumstances of relative rotational directions. Such devices are typically used as "one-way" clutches, for coupling elements together in one direction of rotation and permitting free relative rotation in the opposite direction of rotation.

In part reflecting the difficulties and deficiencies of previously developed devices as briefly described hereinabove, this invention has as an object the bi-directional coupling of rotational driving force or the bi-directional exertion of braking force. In realizing this object of the present invention, the coupling device described hereinafter functions effectively irrespective of the directions of relative rotation of two parts to be coupled together. Thus, the device of this invention is applicable to circumstances where reversing drives are employed.

Yet a further object of this invention is to control the coupling action of a bi-directional coupling device in a manner which facilitates positive engagement when transmission or braking is desired and positive disengagement when no driving force is to be transmitted or braking force exerted. In accomplishing this object of the present invention, the device to be described hereinafter uses a controllable means which may be readily operated by alternating current electrical circuitry, thereby facilitating accommodation of the device of this invention to the usual circumstances of industrial applications.

Yet a further and more specific object of this invention is the coupling together of first and second members by means of a plurality of coupling members interposed between coupling surfaces for frictional engagement therewith. In realizing this object of the present invention, one of the members which define the surfaces is constructed for variation in the effective diameter of the surface and the plurality of coupling members are divided between a series arranged for frictional coupling engagement upon relative rotation in a first direction and a series arranged for frictional coupling engagement upon relative rotation in an opposite direction. Thus, upon a change in the effective diameter of the one member, the two members are coupled together irrespective of the direction of relative rotation therebetween.

Some of the objects of the invention having been stated, other objects will appear as the description proceeds, when taken in connection with the accompanying drawings, in which:

FIG. 1 is a perspective view of an arrangement incorporating the controllable bi-directional coupling device of this invention;

FIG. 2 is an exploded perspective view of the controllable bi-directional coupling device of this invention;

FIG. 5 is a view similar to FIG. 4, taken generally along the line 5—5 in FIG. 3;

FIG. 6 is an enlarged elevation view, taken generally along the line 6—6 in FIG. 5, showing coupling members of the device of this invention in the disengaged position;

FIG. 7 is a view similar to FIG. 6, showing coupling members in the engaged position;

FIG. 8 is a view similar to FIG. 4, showing a modified form of the controllable bi-directional coupling device of this invention, arranged for limited slip operation; and FIG. 9 is an exploded perspective view of elements of the device of FIG. 8 which accomplish controllable slip operation.

Figure 3:
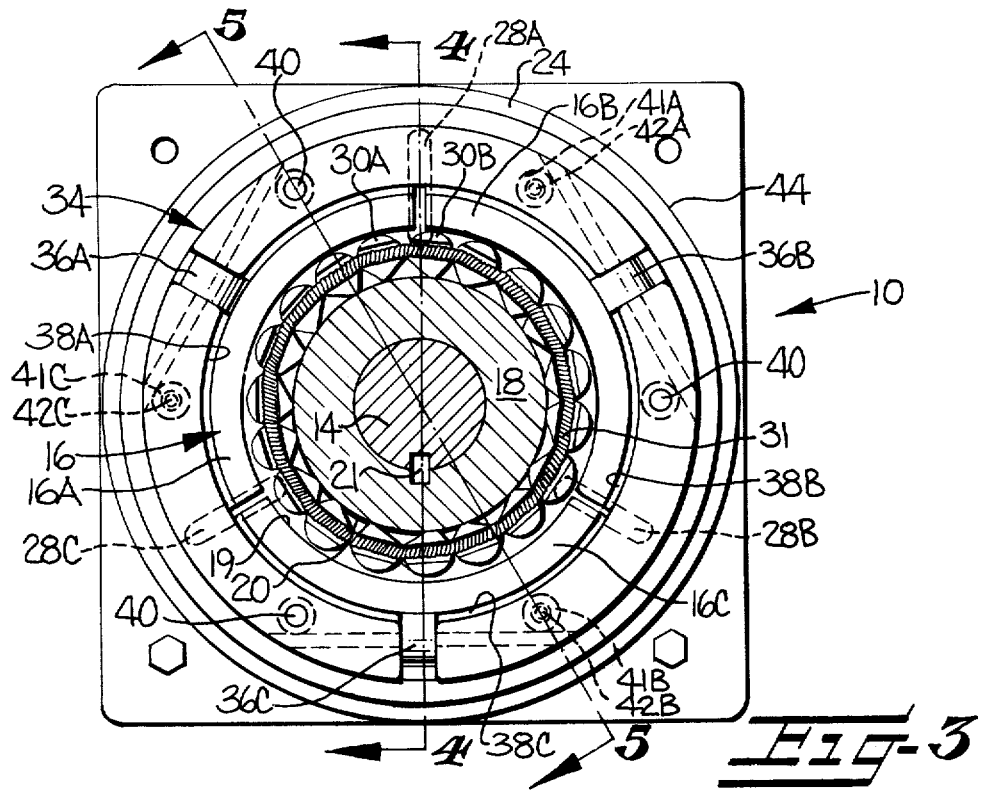
FIG. 3 is an elevation view, partially in section, of the assembled controllable bi-directional coupling device of this invention.

While the controllable bi-directional coupling device of this invention will be described hereinafter with more particularity, and with particular reference to the accompanying drawings, it is to be understood at the outset of this detailed description that the device is illustrated and will be described in the form of the best mode contemplated at the time that this description is being prepared. However, it is contemplated that this invention may be modified in various ways while achieving functions equivalent to those to be described. Accordingly, the description and drawings are to be taken as illustrative only, and not as limiting upon this invention.

Referring now more particularly to the drawings, FIG. 1 illustrates a controllable bi-directional coupling device, generally indicated at 10, in accordance with the present invention and used as a clutch between a driving shaft 11 (not visible in FIG. 1) of an electrical motor 12 and a driven shaft 14 supported for rotation by a suitable bearing 15. While the description which follows will particularly refer to this use of the device 10 as a clutch, it is to be understood that the device 10 is also usable as a brake, where one of the shafts 11, 14 is fixed against rotation and the other of the shafts 11, 14 is to be retarded or held against rotation.

The device 10 includes first and second coupling members 16, 18, each of which defines a corresponding coupling surface. The first member 16 has a coupling surface 19 of generally right circular cylindrical form, facing radially inwardly. The second member 18 has a coupling surface 20 of generally right circular cylindrical form and facing radially outwardly.

In accordance with this invention, one of the members 16, 18 is arranged for controllable variation in a dimension of the corresponding one of the coupling surfaces 19, 20. In the form shown, the first member 16 is defined by three segments of generally arcuate form, each extending over an arc of approximately 120°. By movement of the arcuate portions 16A, 16B, 16C together or apart, the effective diameter of the first coupling surface 19 may be controlled as described more fully hereinafter.

Each of the coupling members 16, 18 is secured to corresponding one of the shafts 11, 14 for rotation therewith. In the instance of the second member 18, this attachment is accomplished by means of a key 21 and set screw 22 (FIG. 4) in a manner generally known. In the instance of the first member 16, this engagement is accomplished through means of a housing member 24 which is fixed to the shaft 11 by a key 25 and set screw 26 and is coupled to the first member 16. In particular, the housing 24 encircles the first member 16 and has mounted therewithin a plurality of vane members 28A, 28B, 28C. These vane members enter into corner notch portions 29A, 29B, 29C defined between adjacent ones of the segments 16A, 16B, 16C of the first member 16 and thus operate to transmit rotational torque between the housing 24 (and thus the shaft 11) and the first member 16.

Interposed between the coupling surfaces 19, 20 are a plurality of coupling members generally indicated at 30, for frictional engagement with the coupling surfaces 19, 20 and thereby for coupling together the members 16, 18 which define the coupling surfaces 19, 20. Each of the coupling members 30 is a contoured cam or sprag element, having one cam surface adjacent the first coupling surface 19 and another cam surface adjacent the second coupling surface 20 (FIGS. 6 and 7).

In accordance with an important feature of this invention, the coupling members 30 include two series of members, generally arranged in alternation about the opposing first and second coupling surfaces 19, 20. A first series of coupling members 30A is arranged to jam or wedge between the coupling surfaces 19, 20 upon relative rotational movement therebetween in one direction of rotation about the axis defined by the shafts 11, 14. The alternate series of coupling members 30B are arranged to jam or wedge between the first and second coupling surfaces 19, 20 upon relative rotational movement between the members 16, 18 in an opposite direction of rotation about the axis defined by the shafts 11, 14. As will be understood by persons familiar with the design of clutches of the type heretofore known as sprag or one-way clutches, that series of coupling members which are not jammed or wedged into frictional engagement will be released from such engagement. Thus, the frictional engagement by which driving forces are transmitted or braking forces are exerted occurs with approximately one-half the number of coupling devices 30, distributed over the circumferences of the coupling surfaces 19, 20, in each of the two directions of rotation.

The coupling members 30 are normally held withdrawn from jamming or wedging engagement by mounting means which also maintains the members in position for actuation as required. In particular, the mounting means include a pair of circular springs 31, 32 which extend through slotted ends of the coupling members 30A, 30B for exerting on the members a force biasing the members among from their respective jammed or wedged positions. It is only upon engagement of the coupling members between the contracted first surface 19 and the second surface 20 that the forces of the springs 31, 32 are overcome and that the members are displaced or cammed into jamming or wedging engagement.

In order to contract the effective diameter of the first coupling surface 19, this invention provides controllable means in the form of an actuating ring member generally indicated at 34 which is received within the housing member 24 and which moves relative to the housing member and the first member 16. The control ring member 34 is provided with a series of notches 35A, 35B, 35C for engagement with the torque vanes 28A, 28B, 28C within the housing member 24. Additionally, the ring member 34 is provided with a series of actuating rollers 36A, 36B, 36C spaced at approximately 120 degree intervals thereabout and projecting inwardly therefrom to engage the outer peripheral surface of corresponding ones of the segments 16A, 16B, 16C of the first member 16.

Figure 4:
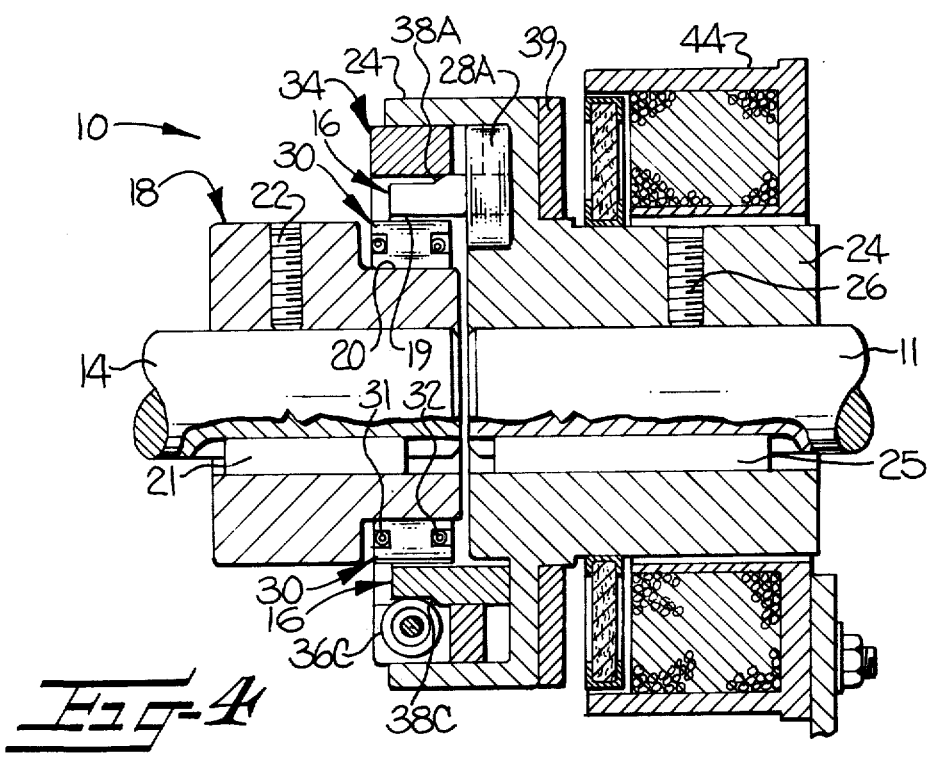
FIG. 4 is an elevation view, in section, taken generally along the line 4—4 in FIG. 3.

The outer surfaces of the segments 16A, 16B, 16C of the first member are configured to define a sloped step cam portion 38A, 38B, 38C for cooperation with the corresponding one of the rollers 36A, 36B, 36C (FIGS. 3-5). Movement of the actuating ring member 34 axially of the shaft 11 and housing member 24 will cause the rollers 36A, 36B, 36C to move axially of the outer surface of the segments 16A, 16B, 16C and engage the slope cam surface portions 38A, 38B, 38C thereof. Such relative axial movement between the actuating ring member 34 and the first member 16 causes contraction of the effective diameter of the first coupling surface 19.

In the illustrated form of this invention, movement of the actuating ring member 34 axially within the housing member 24 is accomplished by the joining of the ring member 34 with an armature member 39 by means of a plurality of mounting bolts 40 which penetrate a portion of the housing member 24 and are secured in the actuating ring member 34 (FIGS. 2 and 5). The position of the actuating ring member 34 is also affected by a series of return springs 41A, 41B, 41C mounted within the housing member 24 on a corresponding series of guide pins 42A, 42B, 42C. The return springs 41A, 41B, 41C act against the actuating ring member 34 to urge the ring member toward the second member 18, to a position where the effective diameter of the first coupling surface 19 is enlarged and the coupling members 30 are out of jammed or wedged frictional engagement between the coupling surfaces 19, 20.

An electrical coil means indicated generally at 44 is provided and may be energized through suitable conductors 45, 46, to generate a magnetic field acting on the armature member 39. Upon such energization of the coil means 44, the armature member 39 and actuating ring member 34 are displaced against the force of the springs 41A, 41B, 41C (and moved to the right in FIGS. 4 and 5) so as to bring about contraction of the effective diameter of the first coupling surface as described hereinabove. The coil 44 and armature member 39 are constructed and arranged to operate effectively using alternating current.

While actuation in the particular manner illustrated and described is presently contemplated as the best mode of operation of the device of this invention, it is to be understood that alternative modes for varying the effective diameter of one or the other of the coupling surfaces 19, 20 are contemplated as being within the scope of this invention. Additionally, it is contemplated that the form of the coupling members 30 and the relationship between the coupling surfaces 19, 20 may be modified in various ways in order to achieve particular desired results, while continuing operation in a manner equivalent to that contemplated by this invention.

One modified form of a device in accordance with this invention is illustrated in FIGS. 8 and 9, where provision is made for controlled slippage between coupled members in such a manner to accomplish control over torque transmitted or exerted. In a effort to avoid needless repetition of description given hereinabove, components of the device of FIGS. 8 and 9 corresponding to components described hereinabove have been identified by common reference characters with the addition of prime notation. The description which follows will be directed primarily to points of distinction between the device of FIGS. 1–7 and the device of FIGS. 8 and 9.

In the modified device, the second member 18' is not fixedly secured to the corresponding shaft 14' but is coupled to that shaft by interposition of an inwardly directed radial rib portion 50 between a pair of friction pads or washers 51, 52. By means of a threaded end portion 54 for the shaft 14', a nut 55 for engaging that threaded end portion, spring washers 56, 58 and a pressure washer 59, the force required to cause relative rotation between the second member 18' and the shaft 14' may be controlled. Thus, the torque exerted or transmitted through a device in accordance with this invention may be controlled by adjusting the spring force applied to the friction pads 51, 52.

Yet a further modification of a device in accordance with this invention (not shown) would provide for positive two position movement of the actuating ring 34, rather than an automatic return to the disengaged position under the influence of return springs 41A, 41B, 41C.

From the above description of the various forms of this invention, it will be understood that the coupling device of this invention may be constructed and arranged for assuming either the coupled or the uncoupled positions in the event of failure. In the embodiment shown by way of example in FIGS. 1 through 7, failure of energization of the electrical coil means 44 would maintain the device in the uncoupled condition. Alternatively, the biasing forces and coupling of various elements could be arranged so that failure of energization would place the device in the coupled condition. It should be understood that the present invention contemplates such variations in actuation.

In the drawings and specification, there has been set forth a preferred embodiment of the invention, and although specific terms are employed, they are used in a generic and descriptive sense only and not for purposes of limitation.

That which is claimed is:

1. A controllable bi-directional coupling device comprising:

a first member mounted for rotation about a predetermined axis and having a first coupling surface, a second member mounted in spaced relation to said first member and having a second coupling surface spaced from said first coupling surface, one of said first and second members being constructed for variation in the effective dimensions of the corresponding one of said first and second coupling surfaces, a plurality of coupling members for controlled frictional engagement with said first and second coupling surfaces, means for mounting said coupling members in position for simultaneous engagement with both of said first and second coupling surfaces, and controllable means for varying the effective dimensions of said one of said first and second members and thereby for controlling frictional engagement of said first and second surfaces with said coupling members, certain of said coupling members frictionally coupling said first and second members upon relative movement therebetween in one direction of rotation about said axis and the remainder of said coupling members frictionally coupling said first and second members upon relative movement therebetween in the opposite direction of rotation about said axis.

2. A device according to claim 1 wherein said second member is mounted for rotation about an axis coaxial with said first member predetermined axis, the device functioning as a clutch for transmitting rotational power from said first member to said second member.

3. A device according to claim 1 wherein said second member is fixedly mounted, the device functioning as a brake for restraining rotation of said first member.

4. A device according to claim 1 wherein said first and second members define concentric radially inwardly facing and radially outwardly facing surfaces functioning as said first and second coupling surfaces, one of said first and second members being constructed for expansion and contraction of the effective diameter of the corresponding one of said first and second coupling surfaces.

5. A device according to claim 1 wherein said first member defines a radially inwardly facing generally cylindrical surface as said first coupling surface and is constructed for expansion and contraction of the effective diameter of said first coupling surface, said second member defines a radially outwardly facing cylindrical surface as said second coupling surface, and said controllable means comprises actuating means for engaging said first member and for urging said first member toward a position in which the diameter of said first coupling surface is contracted.

6. A device according to claim 1 wherein said means for mounting said coupling members in position comprises spring means for biasing said coupling members toward a position withdrawn from frictional engagement with said first and second coupling surfaces.

7. A controllable bi-directional coupling device comprising:

a first member mounted for rotation about a predetermined axis and having a radially inwardly facing cylindrical first coupling surface, a second member mounted in spaced relation to said first member and having a radially outwardly facing cylindrical second coupling surface concentric with and at least partially encircled by said first coupling surface, one of said first and second members being constructed for variation in the effective diameter of the corresponding one of said first and second coupling surfaces, a plurality of first coupling members for controlled frictional engagement with said first and second coupling surfaces and for frictionally coupling said first and second members together upon relative rotation therebetween in one direction of rotation about said axis, a plurality of second coupling members for controlled frictional engagement with said first and second coupling surfaces and for frictionally coupling said first and second members together upon relative rotation, therebetween in an opposite direction of rotation about said axis, means for mounting said first and second coupling members in position for simultaneous engagement with both of said first and second coupling surfaces upon actuating variation in the effective diameter of said corresponding one surface, and controllable means for varying the effective diameter of said one of said first and second members and thereby for frictionally engaging those ones of said first and second coupling members which cooperate with said surfaces upon the relative rotation then occurring.

8. A device according to claim 7 wherein said plurality of first coupling members are arranged about said second coupling surface in general alternation with said plurality of second coupling members for distributing frictional engagement between said first and second surfaces over substantially the entire circumference of said surfaces irrespective of the direction of relative rotation therebetween upon frictional coupling of said first and second members.

9. A device according to claim 7 wherein said first member comprises a plurality of arcuate segments each mounted for movement relative to other of said segments for accomplishing variation in the effective diameter of said first coupling surface and further wherein said controllable means comprises an actuating ring member encircling said first member and mounted for movement axially thereof, said first member segments having outer circumferential surfaces contoured to provide cam surfaces and said actuating ring member having means for engaging said cam surfaces of said first member segments for contracting the effective diameter of said first coupling surface upon movement of said actuating ring member axially relative to said first member segments.

10. A device according to claim 9 wherein said controllable means further comprises an armature member operatively connected to said actuating ring member for moving said actuating ring member and electromagnetic coil means mounted adjacent said armature member for energization and magnetic attraction of said armature means and thereby for initiating coupling together of said first and second members.

11. A device according to claim 7 further comprising controlled slip mounting means for mounting said second member and for accommodating slippage thereof upon exertion of excessive torque on said second member.

* * * * *